3,459,772
ETHYLENEDIOXY SUBSTITUTED
BENZ[e]INDENES
Alan Martin Krubiner, Cedar Grove, and Eugene Paul Oliveto, Glen Ridge, N.J., assignors to Hoffmann-La Roche, Inc., Nutley, N.J., a corporation of New Jersey
No Drawing. Filed July 1, 1965, Ser. No. 468,928
The portion of the term of the patent subsequent to May 28, 1985, has been disclaimed
Int. Cl. C07c *49/30, 167/02;* C07d *13/04*
U.S. Cl. 260—340.9                    8 Claims

ABSTRACT OF THE DISCLOSURE

Synthesis of 3β-derivatives of 3aβ-methyl-benz[e]indenetricyclic compounds by a process which comprises the steps of reacting a 3-oxo or 3-hydroxy 3aβ-methyl-benz[e]indene with ethylidenetriphenylphosphorane and treating the so-obtained 3-ethylidene-3aβ-methyl-benz[e]-indene sequentially with hydroboron and hydrogen peroxide. The tricyclic compounds can be converted to pharmaceutically useful steroids of the 17β-pregnane series.

---

This invention relates to a novel process, intermediates prepared therein and the products obtained therefrom.

Syntheses of steroids have recently become available wherein the tetracyclic steroid molecule is derived from a 3aβ-methyl-benz[e]indene by formation of the A-ring of the tetracyclic steroid nucleus. Thus, 3aβ-methyl-benz[e]-indenes containing a hydroxy or oxo moiety in the 3-position are convertible to steroids of the androstane series. The 3aβ-methyl-benz[e]indenes containing an acetyl or 1-hydroxyethyl group in the 3-position are convertible to steroids of the pregnane series. Steroids of the 17β-pregnane series are particularly valuable compounds and are preparable from 3aβ-methyl-benz[e]indenes containing a 3β-acetyl or 3β-(1-hydroxyethyl) side chain. A problem with this approach has been that, relatively speaking, 3aβ-methyl-benz[e]indenes with a 3β-acetyl or 3β-(1-hydroxyethyl) side chain are much less readily available than 3aβ-methyl-benz[e]indenes having a 3-hydroxy or 3-oxo substituent. The purpose of the present invention is to provide a method for the synthesis of 3β-acetyl or 3β - (1-hydroxyethyl)-3aβ-methylbenz[e]indenes from 3-oxo-3aβ-methyl-benz[e]indenes. 3 - oxo-3aβ-methyl-benz-[e]indenes can be obtained from 3-hydroxy-3aβ-methyl-benz[e]indenes by oxidation with conventional oxidizing agents, for example, chromium trioxide in pyridine or dimethylformamide.

The process of this invention involves two stages. In the first stage a 3-oxo-3aβ-methyl-benz[e]indene is treated with ethylidenetriphenylphosphorane. As a result of this reaction there is obtained a 3 - ethylidene-3aβ-methyl-benz[e]indene. 3 - ethylidene-3aβ-methyl-benz[e]indenes are novel compounds within the scope of this invention. In the second stage of the process of this invention, the 3 - ethylidene-3aβ-methyl-benz[e]indene is subjected to treatment with hydroboron and then hydrogen peroxide. This yields the desired 3β-(1′-hydroxyethyl)-3aβ-methyl-benz[e]indene. The 3β - (1′ - hydroxyethyl)-3aβ-methyl-benz[e]indene can then be converted to a 3β-acetyl-3aβ-methyl-benz[e]indene by oxidation with a conventional oxidizing agent, for example, chromium trioxide in pyridine or dimethylformamide. The term hydroboron, as used herein, refers to moiety consisting of one atom of trivalent boron and one atom of hydrogen. The moiety, accordingly, has two free valences and can be pictured as follows:

>B—H

It can be supplied, for example, by borane (as the term borane is used herein it is intended to mean $BH_3$ in all its forms, e.g., as borane per se, as diborane or as a complex), or by lower alkylborane or dilower alkylborane.

The starting material 3-oxo-3aβ-methyl-benz[e]indene should be one in which all oxo groups other than the 3-oxo group are protected. It is convenient to initially protect any oxo substituent present in other than the 3-position and maintain the substituent in its protected form throughout the process of this invention, regenerating the oxo substituent, if desired, only after the desired 3β-(1′-hydroxyethyl)-3aβ-methyl-benz[e]indene is obtained. On the other hand, if desired, the protecting group can be split off after the ethylidenetriphenylphosphorane treatment, which treatment yields the intermediate 3-ethylidene-3aβ-methyl-benz[e]indene. The protecting group can be inserted and split off by means known per se. Thus, oxo groups present in other than the 3-position can be selectively converted to hydroxy groups. When desired, the oxo groups can then be regenerated by a conventional oxidation means, for example, via oxidation with chromium trioxide in an acidic solution such as glacial acetic acid. If desired, this can be combined with the simultaneous oxidation of the hydroxy group of the hydroxyethyl side chain inserted by the process of this invention at the 3-position. Oxo groups present in other than the 3-position can also be protected by ketalization, i.e., by reaction with a lower alkanediol to yield a lower alkylenedioxy substituent and subsequently, when desired, can be regenerated by means known per se, for example by mild acid hydrolysis, thereby yielding the desired oxo substituent.

The presence of double bonds in the starting material 3aβ-methyl-benz[e]indenes, e.g., between the carbon atoms numbered 1 and 2, the carbon atoms numbered 8 and 9 or the carbon atoms numbered 5 and 5a leads to the attack of these double bonds by the hydroboron-hydrogen peroxide treatment without interference with the desired introduction of the hydroxyethyl side chain in the 3β-position. However, since the end products thus obtained contain a ring hydroxy substituent, such constitutes one aspect of this invention and a separate and preferred aspect of this invention is to use as a starting material a perhydro-3aβ-methyl-benz[e]indene.

Inasmuch as substituents such as those containing a carbonyl moiety (carboxy groups, esters thereof, amides, alkanoyl groups) and nitriles would be affected by the hydroboron treatment of the process of this invention it is preferable that the 3aβ-methyl-3-oxo-benz[e]indene starting material not contain any such substituent. In the case of other substituents, such as lower alkyl, halo, hydroxy, ether groups such as lower alkoxy, lower alkylenedioxy and tetrahydropyranyloxy, or the like, which substituents are not affected by the treatments involved, the process of this invention is of course suitable. Thus, the starting material 3aβ-methyl-3-oxo-benz[e]indene can contain a number of substituents in the molecule without interfering with the process of this invention. For example, it can have lower alkyl groups, hydroxy, lower alkoxy, lower alkylenedioxy, tetrahydropyranyloxy, halogen, etc., substituents in positions 1, 2, 4, 5, 5a, 6, 7, 8, 9, 9a, 9b, as well as on the 3aβ-methyl group.

A particularly significant aspect of the present invention is that it yields 3β-(1′-hydroxyethyl)-3aβ-methyl-benz[e]indenes, i.e., compounds in which the substituents in both the positions 3 and 3a are β, that is have a cis relationship. With the process of this invention it has surprisingly been found that such a stereochemical relationship is obtained irrespective of the stereo chemistry of the remainder of the benz[e]indene molecule. Thus, the process of this invention is applicable to both cis, anti, trans(5aβ,9aβ:3aβ,9bα) and trans, anti, trans(5aα,9aβ:3aβ,9bα) benz[e]indenes, and these are preferred aspects of the present invention. The process of this invention is also applicable to the other possible stereo configurations such as cis, syn, trans (5aα, 9aα:3aβ,9bα). Also the stereo configurations of substituents present in the 6 and/or 7 positions does not effect the stereospecificity of the introduction of the hydroxyethyl side chain to the 3-position via the process of this invention. Thus, the process of this invention yields 3β-(1-hydroxyethyl)-3aβ-methyl-benz[e]indenes and is applicable to benz[e]indenes having, for example, either a 6β-methyl group or a 6α-methyl group and/or having a 7α-hydroxy group or a 7β-hydroxy group.

The first stage of the process of this invention involves the reaction of a 3aβ-methyl-3-oxo-benz[e]indene, wherein all oxo groups in other than the 3-position are protected, with ethylidenetriphenylphosphorane to yield the corresponding 3-ethylidene-3aβ-methyl-benz[e]indene. This reaction is suitably effected in a neutral, nonketonic organic solvent. Organic solvents which can be used are for example: ethers, e.g., lower alkyl ethers such as diethyl ether, dioxane, tetrahydrofuran, or the like; aromatic hydrocarbons such as benzene, xylene, cumene, or the like; di-lower alkyl-lower alkanoyl-amides such as dimethylformamide, dimethylacetamide, or the like; dimethylsulfoxide; etc. It is especially preferred to conduct the reaction with ethylidenetriphenylphosphorane in the same solvent in which the ethylidenetriphenylphosphorane is formed. Since ethylidenetriphenylphosphorane is conveniently formed in dimethylsulfoxide, this latter compound is also a preferred solvent for the reaction of the 3aβ-methyl-3-oxo-benz[e]indene with ethylidenetriphenylphosphorane.

The reaction of the ethylidenetriphenylphosphorane with the 3aβ-methyl-3-oxo-benz[e]indene is suitably conducted at a temperature between room temperature and about 120° C. or the boiling point of the reaction medium, whichever is lower. It has been found that the preferable temperature range in which to conduct the reaction is between about 40° C. and about 80° C. Especially good results are obtained when the reaction is conducted between about 40° C. and about 60° C., and accordingly this is an especially preferred temperature range. The quantities of reagents used are not critical and an excess of either can be used. However, it has been found advantageous to use a molar excess of ethylidenetriphenylphosphorane and especially preferable to use about 4 moles of the ethylidenetriphenylphosphorane for each mole of the 3aβ-methyl-3-oxo-benz[e]indene being reacted.

The above described reaction with ethylidenetriphenylphosphorane yields 3-ethylidene-3aβ-methyl-benz[e]indenes, preferably perhydro but which can also contain ring unsaturations as indicated above. Especially preferred are perhydro-3-ethylidene-3aβ-methyl-benz[e]indenes of the formula

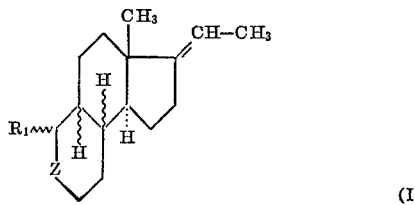

(I)

wherein at an asymmetric carbon atom a solid line indicates a β-stereoconfiguration, a dotted line indicates an α-stereoconfiguration, and a wavy line indicates an α- or a β-stereoconfiguration; $R_1$ is selected from the group consisting of hydrogen and lower alkyl (especially methyl); Z is selected from the group consisting of

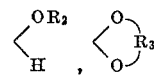

and C=O; $R_2$ is selected from the group consisting of hydrogen, lower alkyl and tetrahydropyranyl and $R_3$ is lower alkylene.

The 3-ethylidene-3aβ-methyl-benz[e]indenes of Formula I can contain substituents other than those specifically indicated in the text indented beneath the formula, as indicated above, but those indicated in the text indented directly above are preferred.

In the second stage of the process of this invention a 3-ethylidene-3αβ-methyl-benz[e]indene is treated with hydrocarbon and then hydrogen peroxide. This stage yields the desired 3β-(1'-hydroxyethyl) - 3aβ - methyl-benz[e]indene having a cis relationship between the substituents at 3 and 3a. In the first aspect of the second stage of the process of this invention, a 3-ethylidene-3aβ-methyl-benz[e]indene is treated with hydrocarbon. The hydrocarbon can be obtained, for example, from borane, alkylborane, or dialkylborane. The term alkylborane comprehends compounds of the formula $$RBH_2 \qquad (II)$$

wherein R is a saturated, straight or branched chain hydrocarbon radical such as lower alkyl, for example, t-hexyl (in which case the compound of Formula II is 2,3-dimethyl-2-butylborane).

The term dialkylborane comprehends compounds of the formula $$R_2BH \qquad (III)$$

wherein each R can be the same or different and R is a saturated, straight or branched chain hydrocarbon radical such as lower alkyl, for example, isoamyl [if both R's are isoamyl, the compound of Formula III is bis-(methyl-1-butyl)-borane].

The treatment with hydrocarbon is preferably effected in an organic solvent: for example, an ether such as a lower alkyl ether, e.g., diethyl ether, dioxane, tetrahydrofuran or the like. When borane is used as the agent yielding the hydroboron, the borane can either be added to the reaction mixture or can be generated in situ. The reaction with the borane is suitably conducted at a temperature between about −20° C. and about 40° C. It is preferably conducted at a temperature between about 0° C. and room temperature. For ease of operation, room temperature is preferred.

In one embodiment it is suitable to add the borane in the form of borane complex, for example, with an ether. A borane:tetrahydrofuran combination has been found particularly suitable. If such is used, it can be added dissolved in a tetrahydrofuran solution. On the other hand, in a different embodiment, the borane can be generated in situ via the addition of a hydride and an acid, either one of which or both of which can contain the element boron. Thus, an alkali metal borohydride (such as sodium borohydride, potassium borohydride, lithium borohydride or the like) and a Lewis acid (such as boron trifluoride, sulfuric acid or the like) can be added to the reaction mixture, thereby generating borane in situ. On the other hand, a nonboron-containing hydride and an acid containing boron can be added to the reaction mixture, thereby generating borane in situ. As exemplary nonboron-containing hydrides there can be mentioned alkali metal hydrides such as sodium hydride and alkali metal aluminum hydrides such as lithium aluminum hydride. Exemplary boron-containing Lewis acids are boron trihalides, for example, boron trifloride or boron trichloride.

Where a nonolefinic starting material has been used for the first stage of the process of this invention, at least one mole of hydroboron (calculated as BH) should be used for each mole of the 3-ethylidene-3aβ-methyl-benz[e]indene being treated. If the starting material 3aβ-methyl-3-oxo-benz[e]indene contains one or more double bonds, a proportionately greater quantity of hydroboron should be used to allow for the hydroboration of these double bonds. With nonolefinic 3aβ-methyl-3-oxo-benz[e]indene starting materials it is suitable to use between one and about two moles of hydroboron for each mole of 3-ethylidene-3aβ-methyl-benz[e]indene. It has been found especially advantageous, for example, to use between 1 and 1½ moles of borane for each mole of 3-ethylidene-3aβ-methyl-benz[e]indene.

Following the treatment with hydroboron, the reaction mixture is adjusted to a pH greater than 7, i.e., is rendered alkaline. This can conveniently be done via the addition of an alkali hydroxide such as caustic soda, or by the addition of a salt of a strong base with a weak acid, or via the addition of an appropriate buffering solution, or by any other conventional means. Hydrogen peroxide is then added to the reaction mixture. The hydrogen peroxide should be used in at least an equimolar amount (with respect to a starting material nonolefinic 3aβ-methyl-3-oxo-benz[e]indene, more if a 3aβ-methyl-3-oxo-benz[e]indene containing one or more double bonds is used as a starting material in the first stage; see discussion supra re quantity of hydroboron to be used), but can be used in excess if desired. The hydrogen peroxide is conveniently added in the form of an aqueous solution. The treatment with hydrogen peroxide can be effected at room temperature, but is suitably effected at lower temperatures for example at about 0° C.

As pointed out above, the two stage sequence of the process of this invention yields 3β-(1'-hydroxyethyl)-3aβ-methyl-benz[e]indenes. The desired 3β configuration is obtained irrespective of the configurations at, for example, the positions 5, 5a, 6, 7, 8, 9, 9a, and 9b. Thus, for example, via the process of this invention 3aβ,6β-dimethyl-3,7-dioxo-5aβ,9aβ,9bα-perhydro-benz[e]indene can be converted, with appropriate protection of the 7-oxo group, to 3β-(1'-hydroxyethyl)-3aβ,6β-dimethyl-7-oxo-5aβ,9aβ,9bα-perhydro-benz[e]indene and 3aβ,6α-dimethyl-3,7-dioxo-5aα,9aβ,9bα-perhydro-benz[e]indene can be converted to 3aβ,6α-dimethyl-3β-(1'-hydroxyethyl)-7-oxo-5aα,9aβ,9bα-perhydro-benz[e]indene. During these conversions there are formed novel 3-ethylidene intermediates, typified by Formula I above. Thus, in the specific conversion mentioned in this paragraph, one obtains, after having protected the 7-oxo group by, for example, ketalization to a 7,7-ethylenedioxy moiety, the novel intermediates, 3aβ,6β-dimethyl-7,7-ethylenedioxy-3-ethylidene-5aβ,9aβ,9bα-perhydro-benz[e]indene, and 3aβ,6α-dimethyl - 7,7 - ethylenedioxy - 3 - ethylidene-5aα,9aβ,9bα-perhydro-benz[e]indene, respectively.

As indicated above, the 3β-acetyl and 3β-(1'-hydroxyethyl)-3aβ-methyl-benz[e]indene obtained by the process of this invention are useful as intermediates for the formation of the tetracyclic steriod nucleus. Thus, if the benz[e]indene obtained by the method of this invention contains an oxo group in the 7-position or a group convertible to an oxo group thereat, the A-ring of the steroid nucleus can be formed by condensing the 7-oxo-benz[e]indene with methyl vinyl ketone according to methods known per se. Thus, 3β-(1'-hydroxyethyl)-3aβ,6β-dimethyl-7-oxo-5aβ,9aβ,9bα-perhydro-benz[e]indene upon condensation with methyl vinyl ketone yields 20-hydroxy-3-oxo-Δ⁴-9β,10α-pregnane and similarly 3β-acetyl-3aβ,6α - dimethyl - 7-oxo-5aα,9aβ,9bα-perhydro-benz[e]indene upon condensation with methyl vinyl ketone yields progesterone.

The following examples are illustrative but not limitative of the invention. All temperatures are stated in degrees centigrade.

EXAMPLE 1

3.0 g. of a 53.4% sodium hydride dispersion in mineral oil (67 mmoles of sodium hydride) was washed 3 times with hexane and blown dry under nitrogen. 50 ml. of dimethylsulfoxide was added thereto and the mixture then heated under nitrogen with stirring at 70–75° until cessation of hydrogen evolution. After about 30 min., there resulted a light green solution which was cooled to room temperature. A solution of 27.9 g. (67 mmoles) of ethyltriphenylphosphonium iodide in 100 ml. of dimethylsulfoxide was then rapidly added to the cooled solution, yielding a deep red solution of ethylidenetriphenylphosphorane, which was subsequently used in the reactions described below.

The ethylidenetriphenylphosphorane solution for use in the reactions described below can also be prepared by other methods, for example, it was prepared by the following alternative methods:

To a solution of 50 g. of ethyltriphenylphosphonium bromide in 200 ml. of dimethylsulfoxide was added 15 g. of potassium t-butoxide in small portions. After stirring for half an hour at room temperature, the so-formed solution of ethylidenetriphenylphosphorane was then used for the reaction described below.

To a solution of ethyltriphenylphosphonium iodide in 250 ml. of dimethylsulfoxide was added 7.3 g. of potassium amide in 50 cc. of dimethylsulfoxide. After stirring for half an hour at room temperature, the so-formed solution of ethylidenetriphenylphosphorane was then used for the reactions described below.

EXAMPLE 2

A mixture of 10.45 g. of 3β-hydroxy-3aβ,6β-dimethyl-7-oxo-5aβ,9aβ,9bα-perhydro-benz[e]indene, 50 ml. of ethylene glycol, 1.5 g. of p-toluenesulfonic acid monohydrate and 500 ml. of benzene was refluxed overnight using a Dean-Stark trap. The cooled mixture was then treated with solid sodium bicarbonate until $CO_2$ evolution ceased, washed with 5% $NaHCO_3$ and water and dried with $Na_2SO_4$. The solvent was removed by evaporation yielding crude 7,7-ethylenedioxy-3β-hydroxy-3aβ,6β-dimethyl-5aβ,9aβ,9bα-perhydro-benz[e]indene, M.P. 110–112°. A small sample was recrystallized from hexane, M.P. 113.5–115°. The crude ketal, which showed no carbonyl absorption in the I.R., was used as is for the subsequent reaction described below in Example 3.

The starting material 3β-hydroxy-3aβ,6β-dimethyl-7-oxo-5aβ,9aβ,9bα-perhydro-benz[e]indene and its method of preparation are not a part of this invention, but such are described below in order that this disclosure be complete.

A solution of 236 mg. of 3β-hydroxy-3aβ,6-dimethyl-7 - oxo - 2,3,3a,4,5,7,8,9,9aβ,9bα - decahydro-1H-benz[e]indene in 40 ml. 95 percent ethanol and 5.25 ml. 2 N aqueous sodium hydroxide solution was hydrogenated with one mole equivalent of hydrogen over 236 mg. of prereduced 5 percent rhodium on alumina catalyst. After separation of catalyst, the solution was concentrated in vacuo to dryness, and the residue taken up in one liter of ether. The ether solution was washed with water, dried over anhydrous sodium sulfate and evaporated to dryness in vacuo. From the residue 3aβ,6β-dimethyl-3β-hydroxy-7-oxo-5aβ,9aβ,9bα-perhydro-benz[e]indene was obtained by crystallization. M.P. 144.5–145°; $[\alpha]_D^{25}$ —14° (c.= 0.103; chloroform).

EXAMPLE 3

12.0 g. of crude 7,7-ethylenedioxy-3β-hydroxy-3aβ,6β-dimethyl-5aβ,9aβ,9bα-perhydro-benz[e]indene was dissolved in 500 ml. of dry dimethylformamide. To this was added in small portions with stirring 12.0 g. of chromium trioxide. To the resultant slightly warm solution, there was then added a solution of 4.0 ml. of concentrated $H_2SO_4$ in 100 ml. of dimethylformamide. The reaction mixture was allowed to stir overnight at room temperature. Solid $NaHCO_3$ was then added and after $CO_2$ evolution ceased, the reaction mixture was diluted with ether and washed with 5% $NaHCO_3$ solution. The aqueous phase was then extracted one additional time with ether, and the combined organic extracts were washed with 5% $NaHCO_3$ and then 3 times with water. Upon drying with $Na_2SO_4$ and evaporating the solvent, there was obtained crude crystalline product, 7,7-ethylenedioxy-3aβ,6β-dimethyl-3-oxo-5aβ,9aβ,9bα-perhydro-benz[e]indene. Recrystallization from n-hexane afforded 7,7-ethylenedioxy-3-oxo-5aβ,9aβ,9bα-perhydro-benz[e]indene as flat plates, M.P. 138–139°.

EXAMPLE 4

To a prepared solution of 59 mmoles of ethylidenetriphenylphosphorane in 150 ml. of dimethylsulfoxide, there was rapidly added, with stirring under nitrogen, a solution of 3.0 g. of 7,7-ethylenedioxy-3-oxo-3aβ,6β-dimethyl-5aβ, 9aβ,9bα-perhydro-benz[e]indene in 100 ml. of dimethylsulfoxide. After being stirred at room temperature for 15 min., the reaction mixture was then heated at 55–60° for 3¾ hr. At this time, thin layer chromatography showed only traces of starting material present. The reaction mixture was then cooled, poured onto ice-water and extracted 3 times with petroleum ether. The organic extracts were washed 3 times with water, dried with $Na_2SO_4$, concentrated and eluted on a short column of alumina (Grade I) which was rinsed through with petroleum ether, yielding 7,7 - ethylenedioxy - 3 - ethylidene - 3aβ,6β - dimethyl-5aβ,9aβ,9bα-perhydro-benz[e]indene which slowly crystallized, M.P. 60–71°.

Vapor phase chromatography indicated that this material was a mixture of 92% cis and 8% trans isomers. A sample was recrystallized from ether-methanol, M.P. 73–75°.

EXAMPLE 5

2.467 g. of 7,7-ethylenedioxy-3-ethylidene-3aβ,6β-dimethyl-5aβ,9aβ,9bα-perhydro-benz[e]indene (the crude product prepared by the procedure of Example 4 above) was dissolved in 100 ml. of dry tetrahydrofuran and treated with 12.0 ml. of 1 molar $BH_3$ solution in tetrahydrofuran under nitrogen with stirring. After 1½ hr., 30 ml. of 10% NaOH was added cautiously, the mixture was cooled to 0° and 12 ml. of 30% hydrogen peroxide was added in the course of 10 min. After stirring for 1 hr. at 0°, water and ether were then added and the separated ether phase was washed with 10% $NaHSO_3$, water and dried with $Na_2SO_4$. The solvent was evaporated yielding crude 7,7-ethylenedioxy-3β-(1R-1-hydroxyethyl)-3aβ,6β-dimethyl-5aβ,9aβ,9bα-perhydro-benz[e]indene as an oil.

EXAMPLE 6

2.486 g. of crude 7,7-ethylenedioxy-3β-(1R-1-hydroxyethyl) - 3aβ,6β - dimethyl - 5aβ,9aβ,9bα - perhydro-benz[e]indene obtained by the procedure of Example 5 was dissolved in 75 ml. of 70% aqueous acetic acid and heated at 60° for 45 min., cooled, poured into water and extracted twice with $CH_2Cl_2$. The combined organic layers were then washed with 5% $NaHCO_3$ until neutral and dried with $Na_2SO_4$. Evaporation of the solvent yielded 3aβ,6β - dimethyl - 3β - (1R - 1 - hydroxymethyl) - 7 - oxo-5aβ,9aβ,9bα-perhydro-benz[e]indene. After repeated crystallization from ether-petroleum ether the product, 3aβ,6β-dimethyl - 3β - (1R - 1 - hydroxymethyl) - 7 - oxo - 5aβ, 9aβ,9bα-perhydro-benz[e]indene, melted at 110–110.5°.

EXAMPLE 7

2.03 g. of crude 7,7-ethylenedioxy-3β-(1R-1-hydroxyethyl) - 3aβ,6β - dimethyl - 5aβ,9aβ,9bα - perhydro-benz[e]indene obtained by the procedure of Example 5 was dissolved in 100 ml. of dimethylformamide and treated with 2.0 g. of $CrO_3$ and 0.4 ml. of conc. $H_2SO_4$ in 20 ml. of dimethylformamide as in the procedure of Example 3. After 4 hrs. at room temperature, the reaction mixture was worked up according to the procedure of Example 9 yielding crude 7,7-ethylenedioxy-3β-acetyl-3aβ,6β-dimethyl-5aβ,9aβ,9bα-perhydro-benz[e]indene.

EXAMPLE 8

1.73 g. of crude 7,7-ethylenedioxy-3β-acetyl-3aβ,6β-dimethyl-5aβ,9aβ,9bα-perhydro-benz[e]indene obtained by the procedure of Example 7 was dissolved in 50 ml. of 70% aqueous acetic acid, heated at 60° for 2 hrs. and worked up according to the procedure of Example 6. The so-obtained crude crystalline product, was recrystallized from ether-hexane to affording 3β-acetyl-3aβ,6β-dimethyl-7-oxo-5aβ,9aβ,9bα-perhydro-benz[e]indene, M.P. 126.5– 128.5°, identical with a sample of the same product made by a different method.

EXAMPLE 9

3 g. of cis-3-ethylidene-3aβ,6β-dimethyl-7,7-ethylenedioxy-5aβ,9aβ,9bα-perhydro-benz[e]indene was placed in 100 ml. of 70% aqueous acetic acid and heated for one hour at 60°. The reaction mixture was then extracted with ether, dried with sodium sulphate and concentrated under reduced pressure. Crystallization of the residue from the ether yielded the product cis-3-ethylidene-3aβ,6β-dimethyl-7-oxo-5aβ,9aβ,9bα-perhydro-benz[e]indene.

EXAMPLE 10

2 g. of cis-3-ethylidene-3aβ,6β-dimethyl-7-oxo-5aβ,9aβ, 9bα-perhydro-benz[e]indene was placed in 150 ml. of ether and 300 mg. of lithium aluminum hydride added thereto. The mixture was then refluxed for 2 hours after which saturated ammonium chloride solution was cautiously added and the supernatant ether layer decanted. The product cis-3-ethylidene-3aβ,6β-dimethyl-7ξ-ol-5aβ, 9aβ,9bα-perhydro-benz[e]indene was isolated by evaporation of the ether.

EXAMPLE 11

To a solution of 4 g. of cis-3-ethylidene-3aβ,6β-7 -ol-5-aβ,9aβ,9bα-perhydro-benz[e]indene in 200 ml. of tetrahydrofuran under nitrogen, there was added, with stirring, 25 ml. of approximately 1 molar solution of borane in tetrahydrofuran. After stirring at room temperature for one hour, 50 ml. of 10% NaOH solution was cautiously added dropwise. The mixture was then cooled to 0° and 30 ml. of 30% hydrogen peroxide added in the course of 15 minutes with stirring. After a further one hour at 0°, ether was added and the resulting organic layer separated and washed with 10% sodium sulphate and water with sodium sulphate and evaporated yielding the product, 3aβ,6β - dimethyl-3β-(1-R-1-hydroxyethyl)-7ξ-ol-4aβ,9aβ,9bα-perhydro-benz(e)indene.

EXAMPLE 12

3 g. of 3aβ,6β - dimethyl-3β-(1R-1-hydroxyethyl)-7ξ-ol - 5aβ,9aβ,9bα - perhydro-benz[e]indene was oxidized with 6 g. of $CrO_3$ and 1 ml. of $H_2SO_4$ in 200 ml. of dimethylformamide. The product 3aβ,6β - dimethyl-3β-acetyl - 7 - oxo-5aβ,9aβ,9bα-perhydro-benz[e]indene was isolated by extraction with ether and melted at 127–129°.

EXAMPLE 13

A mixture of 10.45 g. of 3aβ,6α-dimethyl-3β-hydroxy-7 - oxo-5aα,9aβ,9bα-perhydro-benz[e]indene, 50 ml. of ethylene glycol, 1.5 g. of p-toluenne sulfonic acid monohydrate and 500 ml. of benzene was refluxed overnight using a Dean-Stark trap. The cooled mixture was then treated with solid sodium bicarbonate until $CO_2$ evolution ceased, washed with 50% sodium bicarbonate and water and dried with sodium sulphate. The solvent was removed by evaporation, yielding crude 3aβ,6α-dimethyl-7,7 - ethylenedioxy - 3β - hydroxy-5aα,9aβ,9bα-perhydro-benz[e]indine, which was used as is for the subsequent reaction described below in Example 14.

EXAMPLE 14

12.0 g. of crude 3aβ,6α-dimethyl-7,7-ethylenedioxy-3β-hydroxy - 5aα,9aβ,9bα-perhydro-benz[e]indene was dissolved in 500 ml. of dry dimethylformamide. To this, 12.0 g. of chromium trioxide was added in small portions with stirring. To the resultant slightly warm solution, there was then added a solution of 4.0 ml. of concentrated sulfuric acid in 100 ml. of dimethylformamide. The reaction mixture was allowed to stir overnight at room temperature. Solid sodium bicarbonate was then added and after $CO_2$ evolution ceased, the reaction mixture was diluted with ether and washed with 5% sodium bicarbonate solution. The aqueous phase was then extracted one additional time with ether and the combined organic extracts were washed with 5% sodium bicarbonate solution and then 3 times with water. Upon drying with sodium sulphate and evaporation of the solvent, there was obtained 3aβ,6α-dimethyl - 7,7 - ethylenedioxy-3-oxo-5aα,9aβ,9bα-perhydrobenz[e]indene.

EXAMPLE 15

To a solution of 118 mmoles of ethylidenetriphenylphosphorane and 200 ml. of dimethylsulfoxide, there was added a solution of 6 g. of 3aβ,6α-dimethyl-7,7-ethylenedioxy - 3β - oxo-5aα,9aβ,9bα-perhydro-benz[e]indene in 200 ml. of tetrahydrofuran. The so-formed reaction mixture was stirred at 50° for 5 hours and then quenched in ice water. The product was isolated via repeated extraction with petroleum ether, and the organic extracts were washed with water, dried with sodium sulphate, concentrated and eluted on a short column of alumina (Grade I) which was rinsed with petroleum ether, yielding 3aβ,6α-dimethyl - 7,7 - ethylenedioxy-3-ethylidene-5aα,9aβ,9bα-perhydro-benz[e]indene.

EXAMPLE 16

4 g. of 3aβ,6α-dimethyl-7,7-ethylenedioxy-3-ethylidene-5aα,9aβ,9bα - perhydro-benz[e]indene was dissolved in 150 ml. of dry tetrahydrofuran. The solution was then treated with 16 ml. of 1 molar $BH_3$ solution in tetrahydrofuran under nitrogen with stirring. After 2 hours, 45 ml. of 10% NaOH was added cautiously, the mixture cooled to 0° and 20 ml. of 30% hydrogen peroxide then added in the source of 25 minutes. After stirring for 1.5 hours at 0°, water and ether were added and the separated ether phase was washed with sodium sulphate and water and dried with sodium sulphate. The solvent was evaporated yielding 3aβ,6α-dimethyl-7,7-ethylenedioxy-3β-(1R-1-hydroxyethyl)-5aα,9aβ,9bα-perhydro-benz[e]indene.

EXAMPLE 17

3.5 g. of crude 3aβ,6α - dimethyl-7,7-ethylenedioxy-3β-(1R - 1 - hydroxyethyl)-5aα,9aβ,9bα-perhydro-benz[e]indene obtained by procedure of Example 16 was dissolved in 200 ml. of 80% aqueous acetic acid and heated at 60° for 75 minutes, cooled, poured into water and extracted twice with dichloromethane. The combined organic layers were then washed with 5% sodium bicarbonate until neutral and dried with sodium sulphate. Evaporation of the solvent yielded crude 3aβ,6α-dimethyl - 3β - (1R-1-hydroxyethyl)-7-oxo-5aα,8aβ,9bα-perhydro-bene[e]indene.

EXAMPLE 18

4.5 g. of crude 3aβ,6α-dimethyl-(1R-1-hydroxyethyl)-7 - oxo - 5aα,9aβ,9bα-perhydro-benz[e]indene obtained by the procedure of Example 16 was dissolved in 200 ml. of dimethylformamide. To this 4.5 g. of chromium trioxide was added in small portions with stirring. To the resultant slightly warm solution there was then added a solution of 1 ml. of concentrated sulfuric acid in 100 ml. of tetrahydrofuran. The reaction mixture was stirred overnight at room temperature. Solid sodium bicarbonate was then added and after $CO_2$ evolution ceased, the reaction mixture was diluted with ether and washed with 5% sodium bicarbonate. The aqueous phase was then extracted one additional time with ether and the combined organic extracts were washed with 5% sodium bicarbonate and then 3 times with water. Upon drying with sodium sulphate and evaporating the solvent, there was obtained 3aβ,6α - dimethyl-3β-acetyl-7-oxo-5aα,9aβ,9bα-perhydro-benz[e]indene melting at 125–127°.

As indicated, the starting material 3aβ-methyl-3-oxo (or 3β-hydroxy)-benz[e]indenes are not a part of this invention. Many such compounds are known in the literature. Some, however, have not been described in the literature. For example, 3aβ,6β-dimethyl-3-oxo(or 3β-hydroxy)-7-oxo-5aβ,9aβ,9bα-perhydro-benz[e]indenes are a class of compounds which has not hitherto been described in the literature. Such compounds and their preparations are not a part of this invention, and the following description is given only for the sake of completeness. They can be prepared, for example, from corresponding 3aβ,6α-dimethyl-3-oxo(or 3β - hydroxy) - 7 - oxo(or protected oxo)-5aα,9aβ,9bα - perhydrobenz[e]indenes via a two step sequence of halogenation and dehydrohalogenation, yielding corresponding 3-oxo(or 3β-hydroxy)3aβ, 6-dimethyl-7-oxo-2,3,3a,4,5,7,8,9,9aβ,9bα - decahydro-1H-benz[e]indenes, followed by catalytic hydrogenation using a precious metal catalyst such as rhodium, for example, rhodium on charcoal or rhodium on alumina. The halogenation can be effected, for example, via treatment with bromine at ice temperature or below in an organic medium such as acetic acid with the addition of hydrogen bromide as a catalyst. The subsequent dehydrohalogenation is conducted under mild dehydrohalogenating conditions; for example, by the use of lithium carbonate or a lithium halide in an organic solvent such as dimethylformamide, or with an organic base such as collidine or pyridine. The dehydrohalogenation is conducted at a temperature between 50° C. and 150° C., preferably between 80° C. and 120° C. The catalytic hydrogenation is effected in an organic solvent, for example, methanol, ethanol, dioxane, diglyme, cyclohexane or hexane, in the presence of an acidic or basic catalyst, for example, sodium hydroxide or hydrochloric acid, at a temperature between —5° C. and 100° C., preferably between 0° C. and 35° C.

The term "3aβ-methyl-benz[e]indene" as used throughout this specification and in the claims, unless otherwise indicated, comprehends compounds having the following skeletal formula (the numbering is shown for convenience only):

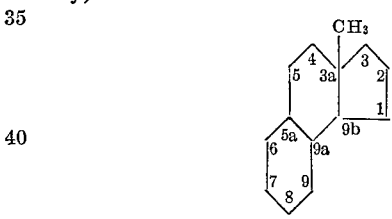

(IV)

That is the term "3aβ-methyl-benz[e]indene" comprehends compounds having the above nucleus irrespective of the degree of saturation, except if indicated otherwise, for example, by a prefix such as "perhydro" (this prefix indicates full saturation).

We claim:
1. A compound of the formula

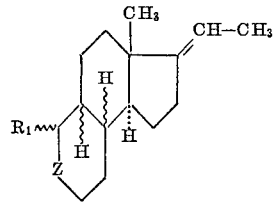

wherein $R_1$ is hydrogen or lower alkyl; and Z is selected from the group consisting of

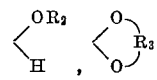

and C=O, wherein $R_2$ is hydrogen, lower alkyl or tetrahydropyranyl and $R_3$ is lower alkylene.

2. 3aβ,6β-dimethyl-3-ethylidene-7,7 - lower alkylenedioxy-5aβ,9aβ,9bα-perhydro-benz[e]indene.

3. 3aβ,6β - dimethyl - 3 - ethylidene - 7,7 - ethylenedioxy-5aβ,9aβ,9bα-perhydro-benz[e]indene.

4. 3aβ,6β - dimethyl - 3 - ethylidene - 7 - RO - 5aβ,9aβ, 9bα - perhydro-benz[e]indene wherein RO is hydroxy, lower alkoxy or tetrahydropyranyloxy.

5. 3aβ,6β - dimethyl - 3 - ethylidene - 7 - hydroxy - 5aβ, 9aβ,9bα-perhydro-benz[e]indene.

6. 3aβ,6β - dimethyl - 3 - ethylidene - 7 - oxo - 5aβ,9aβ,9bα-perhydro-benz[e]indene.

7. 3aβ,6α-dimethyl-3-ethylidene-7,7 - lower alkylenedioxy-5aα,9aβ,9bα-perhydro-benz[e]indene.

8. 3aβ,6α - dimethyl - 3 - ethylidene - 7,7 - ethylenedioxy-5aα,9aβ,9bα-perhydro-benz[e]indene.

References Cited

FOREIGN PATENTS 813,539  5/1959  Great Britain.

OTHER REFERENCES

Allred et al.: "Journal of Organic Chemistry," vol. 25 (1960), pp. 26–29.

"Research," Chem. & Eng. News, Jan. 19, 1959, pp. 36–7.

Bose et al.: "Journal of Organic Chemistry," vol. 30 (1965), pp. 505, 509.

ALEX MAZEL, Primary Examiner

J. H. TURNIPSEED, Assistant Examiner

U.S. Cl. X.R.

260—340, 345, 397, 488, 586, 611, 617